April 10, 1934. A. R. MALLARD 1,954,571
HOOD
Filed July 13, 1932 2 Sheets-Sheet 1
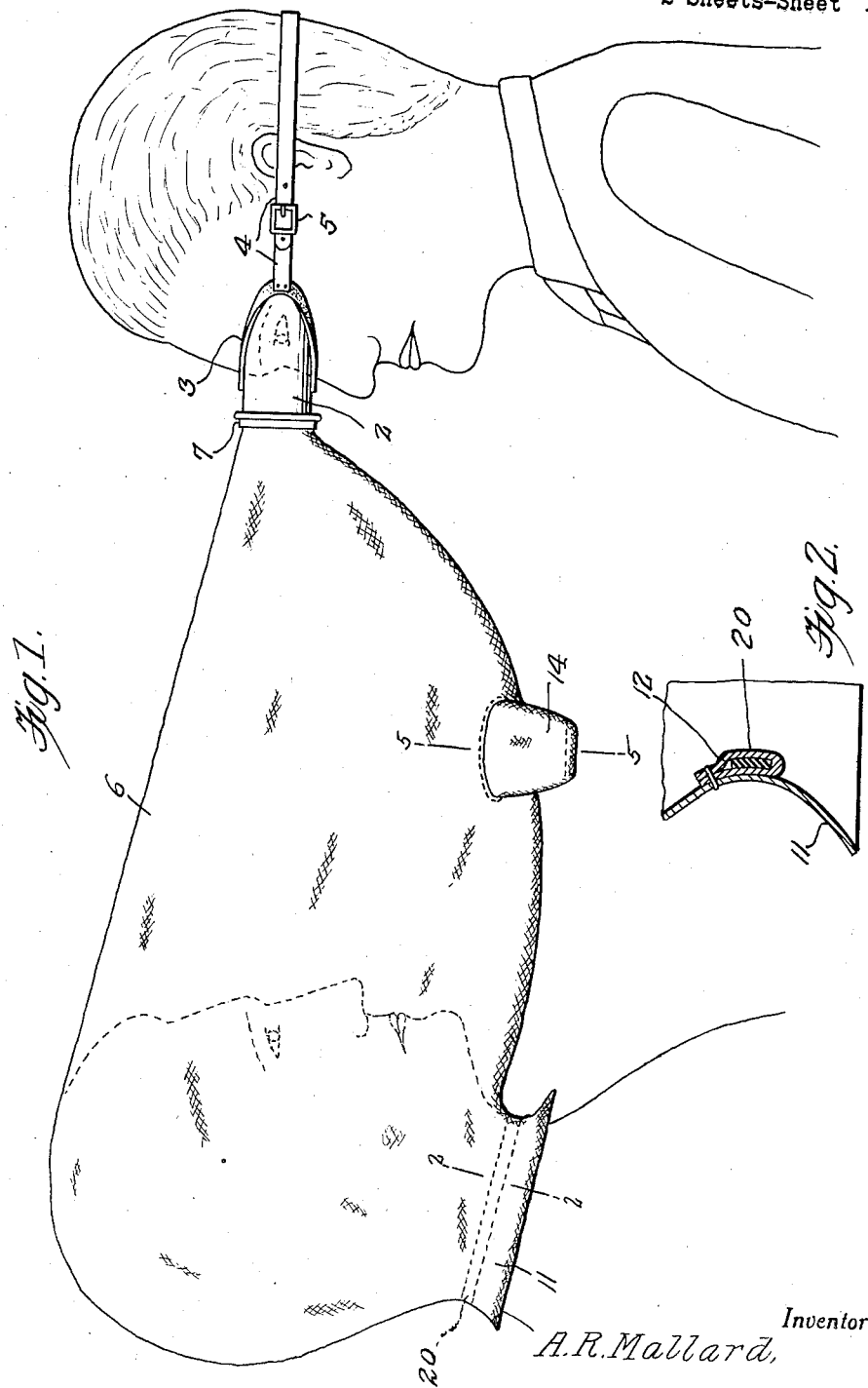

April 10, 1934.  A. R. MALLARD  1,954,571
HOOD
Filed July 13, 1932  2 Sheets-Sheet 2
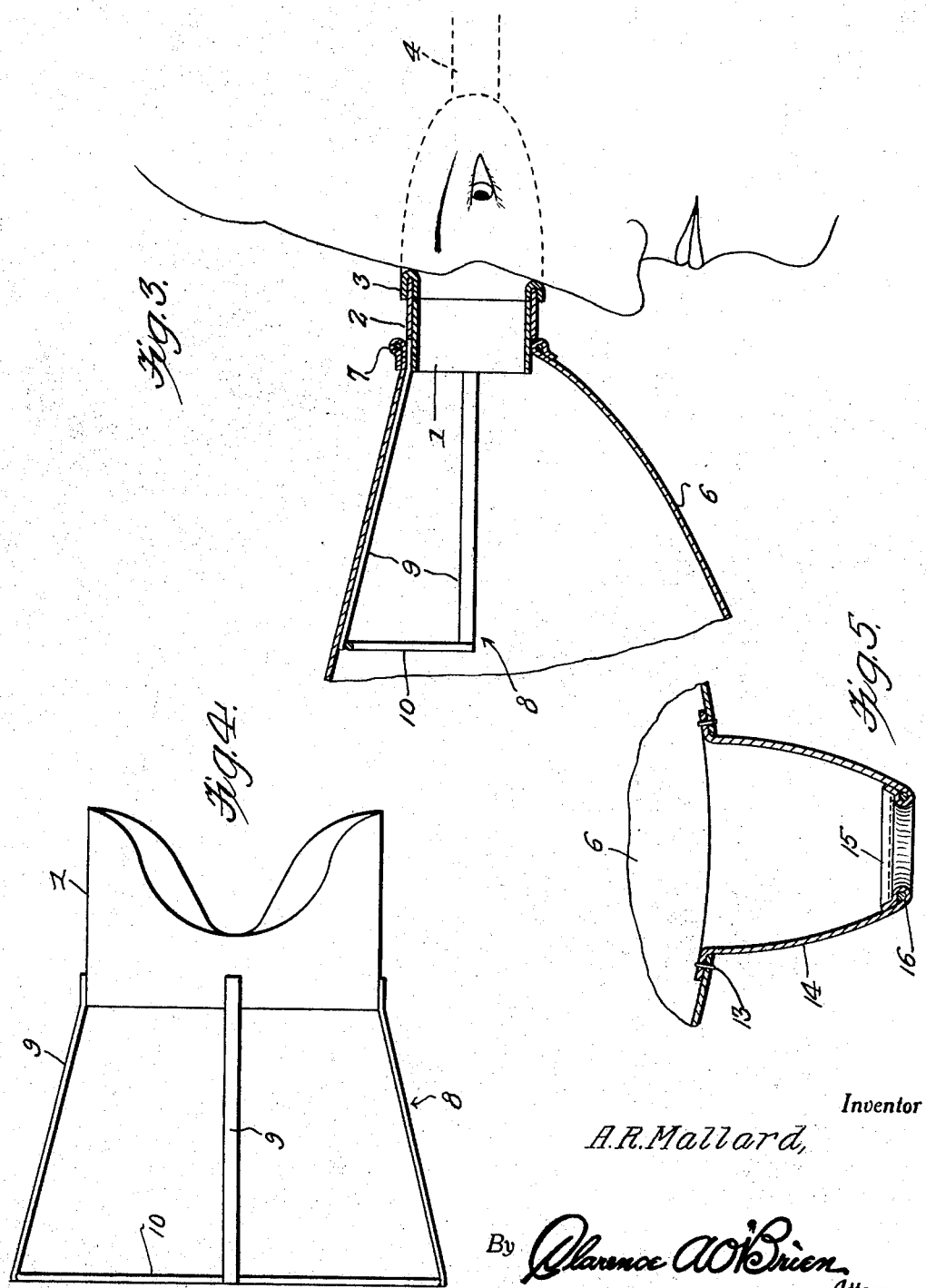
Inventor
A.R.Mallard,
By Clarence A.O'Brien
Attorney Patented Apr. 10, 1934

1,954,571

UNITED STATES PATENT OFFICE 1,954,571

HOOD

Alvin R. Mallard, Goldsboro, N. C.

Application July 13, 1932, Serial No. 622,331

6 Claims. (Cl. 128—2)

The present invention relates to new and useful improvements in hoods which are particularly intended for use by physicians and dentists in making transillumination examinations and has for its primary object to provide, in a manner as hereinafter set forth, a device of this character embodying a novel construction, combination and arrangement of parts through the medium of which light may be entirely eliminated between and around the head of the patient and the eyes of the operator, thus dispensing with the necessity of having a dark room in which to take the subject or patient for examination.

Another important object of the invention is to provide a transillumination hood including an eye piece mounted on the operator's head to which the bag is connected, together with a novel supporting frame projecting from the eye piece for supporting the adjacent portion of the bag.

Other objects of the invention are to provide a transillumination hood which will be simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in side elevation, showing a transillumination hood constructed in accordance with the present invention in use.

Figure 2 is a detail view in vertical section, taken substantially on the line 2—2 of Figure 1.

Figure 3 is a view in vertical longitudinal section through the end portion of the hood which is mounted on the operator's head.

Figure 4 is a detail view in top plan, showing the mounting of the frame on the eye piece.

Figure 5 is a detail view in vertical section, taken substantially on the line 5—5 of Figure 1.

Referring now to the drawings in detail, it will be seen that the embodiment of the present invention which has been illustrated comprises an eye piece 1 of suitable light metal, preferably aluminum, which is shaped at one end to conform to that portion of the operator's head with which said one end is engaged. The eye piece 1 further includes a covering 2 and a cushion 3 of suitable material, preferably black plush, which encloses the end portion of the eye piece which comes in contact with the operator's head. The eye piece 1 is secured in position on the operator's head through the medium of straps 4 extending from the ends of said eye piece and adjustably connected together through the medium of a buckle 5.

The reference numeral 6 designates a bag or body of suitable flexible opaque material, preferably black cloth, having one end restricted and secured around the eye piece 1, as at 7. Mounted on the eye piece 1 and projecting therefrom into the bag or body 6 is a frame which is designated generally by the reference numeral 8. The frame 8 comprises a plurality of diverging metallic arms 9 which are mounted on the eye piece 1 and between the free end portions of which a connecting wire or rod 10 extends. The frame 8 constitutes means for preventing the bag or body 6 from sagging in a manner to obstruct the operator's view of the patient through the eye piece 1 when the hood is in use. This frame constitutes an important and desirable feature of the present invention.

The lower portion of the other, or large, end of the bag or body 6 is formed to provide a depending neck 11 for the passage of the head of the patient or subject. The neck 11 is flared and when the hood is in use, said neck 11 encircles the neck of the patient or subject, as clearly seen in Figure 1 of the drawings. Secured to the inner periphery of the neck 11 is a pocket 12 which encloses an elastic band 20, providing means for preventing the passage of light into the hood at this point.

Depending from an intermediate portion of the bag or body 6 and stitched thereto, as at 13, is a pair of sleeves 14 which permit the arms of the operator, together with the lamp, to be conveniently passed into the bag or body. The lower end portions of the sleeves 14 are provided with internal hems 15 which enclose elastic bands 16 for restricting the sleeves and preventing passage of light at these points when the hood is in use.

When the hood is in use, the patient's head is passed through the neck 11 into the larger end portion of the bag or body 6. The eye piece 1 is then adjusted to the operator's head, after which the hands of the operator, in one of which the lamp may be held, are passed into the hood through the sleeves 14. Thus, the only light that there will be in the hood will be that radiated by the diagnostic lamp.

It is believed that the many advantages of a hood constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. An opaque hood comprising an eye piece, means for mounting the eye piece in position on the head of an operator, a bag of flexible material connected at one end to the eye piece, said bag having an opening in its other end portion for the passage of the head of a subject into the bag, and an open ended sleeve like member carried by the intermediate portion of said bag and communicating with the interior of said bag to provide for the passage of the operator's hand together with an illuminating means into said bag.

2. An opaque hood comprising an eye piece, means for mounting the eye piece in position on the head of an operator, a bag of flexible material connected, at one end, to the eye piece, a neck depending from the other end portion of the bag for the passage of the head of a subject into said bag, a pocket secured on the inner periphery of the neck, an elastic band enclosed in the pocket for contracting the neck about the neck of the subject, and an open ended sleeve like member carried by the intermediate portion of said bag and communicating with the interior of said bag to provide for the passage of the operator's hand together with an illuminating means into said bag.

3. An opaque hood comprising an eye piece, means for mounting the eye piece in position on the head of an operator, a bag of flexible material connected, at one end, to the hood, and having an opening in its other end portion for the passage of the head of a subject into the bag, a frame mounted on the eye piece and projecting therefrom into the bag for supporting said bag, and an open ended sleeve-like member carried by the intermediate portion of said bag and communicating with the interior of said bag to provide for the passage of the operator's hand together with an illuminating means into said bag.

4. An opaque hood comprising an eye piece, means for mounting the eye piece in position on the head of an operator, a bag of flexible material connected, at one end, to the hood, and having an opening in its other end portion for the passage of the head of a subject into the bag, a frame mounted on the eye piece and projecting therefrom into the bag for supporting said bag, said one end portion of the bag encircling the eye piece, the frame including outwardly diverging arms and a rod connecting the outer end portions of the arms together, and an open-ended sleeve-like member carried by the intermediate portion of said bag and communicating with the interior of said bag to provide for the passage of the operator's hand together with an illuminating means into said bag.

5. A hood for diagnostic purposes comprising an opaque hollow body, an eye piece for an operator on one end of the body registering with the interior thereof, said body having an opening at the other end for the passage of the head of the subject to be treated into said body, and said body further formed with an opening in an intermediate portion of the wall thereof and communicating with the interior thereof to provide for the passage of the operator's hand.

6. A hood for diagnostic purposes comprising an opaque hollow body, said body having an opening at one end through which the subject to be treated may be viewed, said body having an opening at the other end for the passage of the head of the subject to be treated into said body, and said body further formed with an opening in an intermediate portion of a wall thereof and communicating with the interior thereof to provide for the passage of the operator's hand.

ALVIN R. MALLARD.